United States Patent
Kobayashi

(10) Patent No.: US 6,976,378 B2
(45) Date of Patent: Dec. 20, 2005

(54) BENDING MACHINE

(75) Inventor: Norio Kobayashi, Koga (JP)

(73) Assignee: Sanoh Kogyo Kabushiki Kaisha, Ibaraki-ken (JP)

( * ) Notice: Subject to any disclaimer, the term of this patent is extended or adjusted under 35 U.S.C. 154(b) by 120 days.

(21) Appl. No.: 10/203,773

(22) PCT Filed: Feb. 19, 2001

(86) PCT No.: PCT/JP01/01171

§ 371 (c)(1),
(2), (4) Date: Aug. 13, 2002

(87) PCT Pub. No.: WO01/60542

PCT Pub. Date: Aug. 23, 2001

(65) Prior Publication Data
US 2003/0019270 A1    Jan. 30, 2003

(30) Foreign Application Priority Data
Feb. 17, 2000   (JP) .............................. 2000-039873

(51) Int. Cl.[7] .......................... B21D 7/04; B21D 7/024
(52) U.S. Cl. .............................. 72/149; 72/159; 72/385
(58) Field of Search .................... 72/149, 150, 151, 72/152, 153, 154, 155, 156, 157, 158, 159, 72/385, 383

(56) References Cited

U.S. PATENT DOCUMENTS

| | | | | |
|---|---|---|---|---|
| 4,485,658 A | * | 12/1984 | Stewart et al. | 72/149 |
| 4,727,738 A | * | 3/1988 | Yogo | 72/157 |
| 5,937,687 A | * | 8/1999 | Bhandari et al. | 72/155 |

FOREIGN PATENT DOCUMENTS

| | | |
|---|---|---|
| JP | 5524971 | 4/1982 |
| JP | 5756114 | 4/1982 |
| JP | 217705 | 5/1990 |
| JP | 639220 | 5/1994 |

* cited by examiner

*Primary Examiner*—David Jones
(74) *Attorney, Agent, or Firm*—Ladas & Parry LLP

(57) ABSTRACT

A bending machine according to the present invention include: a first fixture member 22 for holding one end portion of a long work 20; a second fixture member 24 for holding the other end portion of the work 20; a rack 30 mounted on the first fixture member 22 so as to extend in longitudinal directions of the first fixture member 22; a roll-shaped bending die 21, mounted on the second fixture member 24, for bending the work along the outer peripheral surface of the second fixture member; a pinion gear 26 which is coaxially connected to the bending die 21 via a shaft 28 and which engages the rack 30; and a connecting member 27 for connecting the first fixture member 22 to the second fixture member 24 via the shaft 28 in a relatively rotatable state so that the pinion gear 26 is movable along the rack 30 while engaging the rack 30.

9 Claims, 11 Drawing Sheets

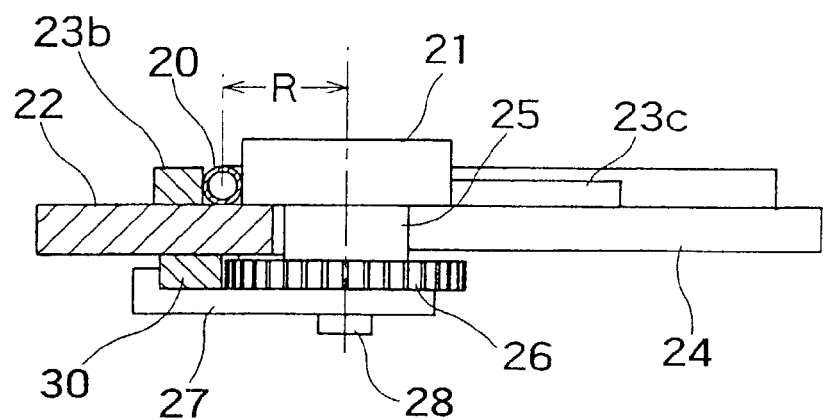
F I G. 2
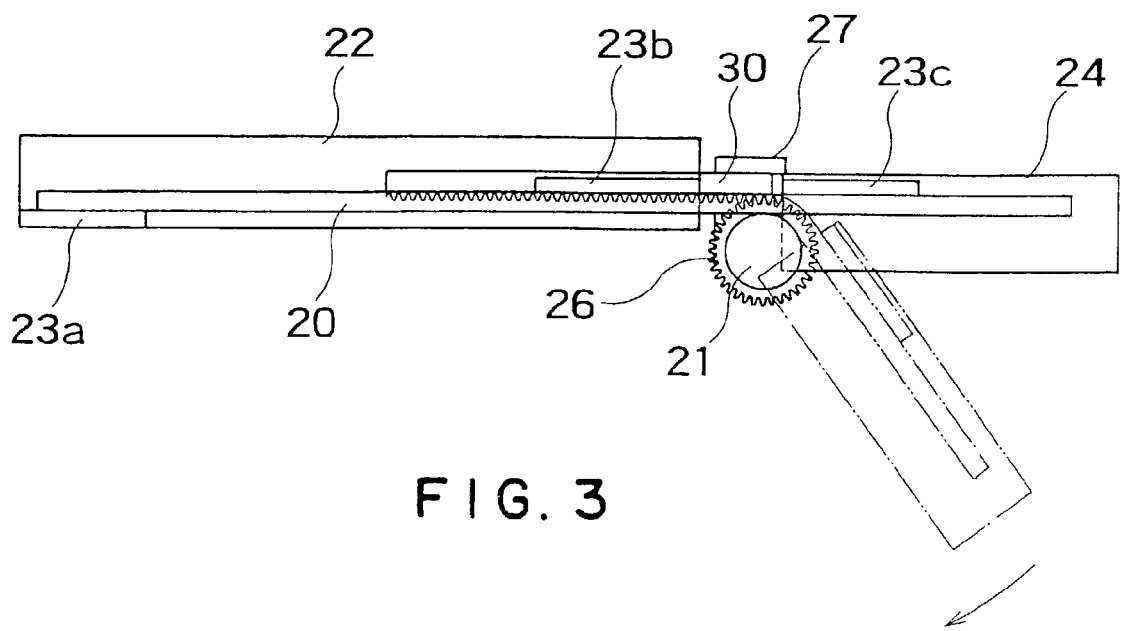
F I G. 3

BENDING MACHINE

This application is a 371 of PCT/JP01/01171 filed Feb. 19, 2001.

BACKGROUND OF THE INVENTION

1. Field of the Invention

The present invention generally relates to a bending machine used for bending a tube or pipe made of metal or the like. More specifically, the invention relates to a bending machine capable of efficiently proceeding a bending operation without collapsing the tube.

2. Description of the Prior Art

A tube made of metal is such as of use in a fuel supply system or exhaust system of an automobile engine. This kind of tube is manufactured by bending a long metal tube having a circular cross-section so as to obtain a desired shape since a desired specified arrangement of the tube is necessary so as not to interfere with structural members and other parts of a body of the automobile. A conventional bending machine used for bending operation is shown in FIG. 12.

This bending machine 1 is provided with a roll-shaped bending die 7 and a clamp die 9 for clamp a tube 3 onto the roll-shaped bending die 7. The pressure die 11 presses the periphery of the tube 3 and moves in a direction of arrow A to rotate the bending die 7 in a direction of arrow B to pull the tube 3 around the peripheral surface of the bending die 7. The clamp die 9 is retractable in directions of arrows C and D along a guiding base 13 connected to the bending die 7. The clamp die 9 which is clamping the tube 3 with the cooperation of the bending die 7 is enable to rotate in a direction of arrow B. A groove 15 having a arc-shaped cross-section and corresponding to the outer surface of the tube is formed in the outer periphery of the bending die 7. Pressure contact surfaces of the clamp die 9 and the tube presser 11 have Similar grooves 17 and 19 adapted for contacting the tube 3.

THE PROBLEMS TO BE SOLVED BY THE INVENTION

However, in the conventional bending machine, in a case where one end portion of the tube 3 is clamped fixedly by the pressure die 11, the other end portion of the tube 3 can not be completely clamped by the clamp die 9. Because it is impossible to bend the tube 3 if it is completely clamped. Therefore, in the bending machine of FIG. 12, the tube 3 is clamped slidably so as to be allowed to be shifted as it is bent between the groove 17 of the clamp 9 and the bending die 7. Therefore, in the conventional bending machine, the position of the end of the tube 3 is inevitably different from the initial position after completion of the bending operation. In addition, excessive force is applied to the tube 3 to easily cause deformation, such as collapsing under overload.

Tubes used in the fuel supply system are generally have a plurality of sections where the bend is to be formed. If a simultaneous multistage-bent operation is carried our at a time to form the tube after clamped the tube, the tube is stretched in the middle of bending operation to prevent it from being further bent, so that multistage-bent operation is conventionally carried out step by step. In such a case, since the position of the end of the tube is shifted every one bending step, it is required to adjust the position of the tube by every one bending step, so that it takes a lot of time to complete all of bending operations necessary to manufacture a piece of tube.

SUMMARY OF THE INVENTION

It is therefore an object of the present invention to eliminate the aforementioned problems and to provide a bending machine capable of shaping a bend section of the tube smoothly in the process where the tube is forced to be pressed along the outer surface of a bending roll.

It is another object of the present invention to provide a bending machine capable of carry out a multistage-bent operation at a time to shape the tube with a plurality of vend sections and capable of greatly improving efficiency of the multistage-bent operation.

In order to accomplish the aforementioned and other objects, according to one aspect of the present invention, a bending machine comprises: a first fixture member for holding one end portion of the workpiece thereon; a second fixture member for holding the other end portion of the workpiece thereon; a first rack mounted on the first fixture member so as to extend in longitudinal directions of the first fixture member; a bending die having a form of a roll, secured on the second fixture member, for providing the workpiece to be bent with a circular form along about the outer peripheral surface of the bending die; a pinion gear, attached fixedly and coaxially with the bending die, adapted for meshing with the first rack; and a connecting means for connecting the first fixture member to the second fixture member in an arrangement that allows each of the fixture members to rotate relatively so that the pinion gear is movable along the first rack while engaging therewith.

According to another aspect of the present invention, a bending machine involves a bending unit comprising; a plurality of primary bending units, each comprising first and second fixture members for holding both end portions of the workpiece to be bent thereon, a rack mounted on the first fixture member, a bending die having a form of a roll which is secured on the second fixture member, for providing the workpiece to be bent with a circular form along about the outer peripheral surface of the bending die, a pinion gear attached fixedly and coaxially with the bending die, for meshing with the first rack, and a connecting means for connecting the first fixture member to the second fixture member in an arrangement that allows each of the fixture members to rotate relatively so that the pinion gear is movable along the first rack while engaging with the rack; a plurality of link members which are connected to each other via the primary bending units in the form of zigzag; a plurality of sliders for rotatably supporting the link members, respectively; and a guide rail for guiding the sliders, with which the sliders slidably engage.

According to the present invention, it is possible to smoothly bend a workpiece in a process for bending the workpiece along the outer peripheral portion of the rolls, and particularly, it is possible to precisely bend a tube without deformation, such as crashing.

In addition, it is possible to carry out multi-stage bending operations with respect to a single workpiece at a time, so that it is possible to greatly improve the bending efficiency.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings:

FIG. 2 is a partially sectional side view of the bending machine in the preferred embodiment;

FIG. 3 is a plan view showing the operation of the bending machine in the preferred embodiment;

DESCRIPTION OF THE PREFERRED EMBODIMENTS

Referring now to the accompanying drawings, the preferred embodiments of a bending machine according to the present invention will be described below.

[First Preferred Embodiment]

Figure 1:
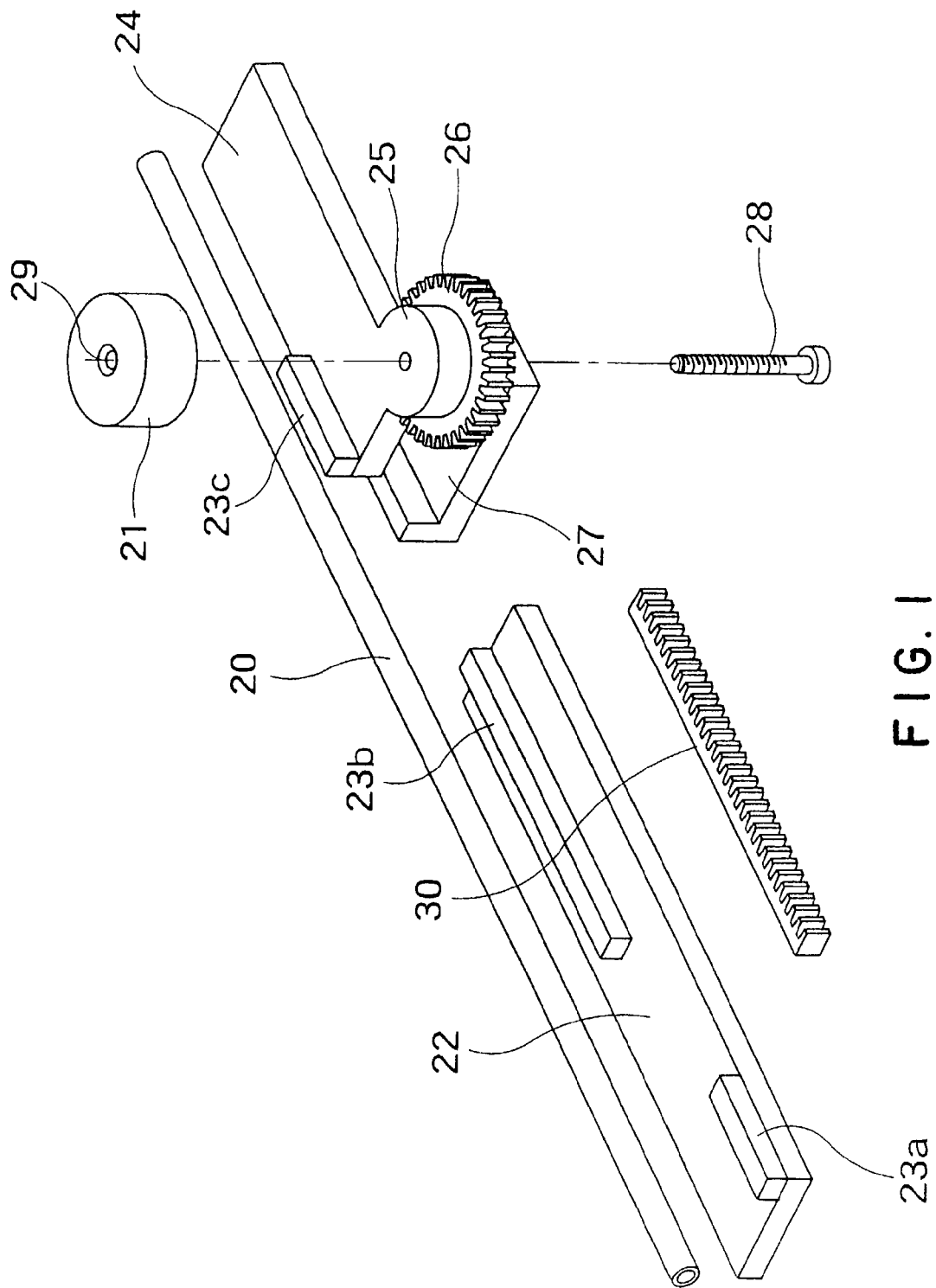
FIG. 1 is an exploded perspective view of a preferred embodiment of a bending machine according to the present invention.

FIG. 1 is a perspective view of a preferred embodiment of a bending machine according to the present invention.

In FIG. 1, reference number 20 denotes a tube provided for a workpiece to be bent. In this preferred embodiment, the tube 20 is a metal tube. Reference number 21 denotes a roll which is used as a bending die. A first fixture plate 22 is a long plate member having a predetermined length. A pair of tube pressure dies 23a and 23b for positioning the tube 20 and preventing the tube 20 from moving are fixed on the first fixture plate 22 at a predetermined interval. Similarly, a tube pressure die 23c is fixedly mounted on a second fixture plate 24. The tube 20 can be held firmly on the second fixture plate 24 between the tube pressure dies 23a, 23b and the tube pressure dies 23a and 23c during the bending operation.

A boss portion 25 having a short cylindrical form is welded on the second fixture plate 24. A pinion gear 26 is attached to the boss portion 25 coaxially and integrally. In this preferred embodiment, the boss portion 25 is integrated with the pinion gear 26. On the pinion gear 26, a connecting member 27 having an L-shaped cross-section is joined by means of a bolt 28.

On the other hand, as shown in FIG. 2, a rack 30 containing teeth for meshing with the pinion gear 26 is fixedly mounted on the first fixture plate 22 50 as to extend in a direction parallel to its longitudinal direction. In this case, the first fixture plate 22 and the second fixture plate 24 are joined to each other by means of the connecting member 27 so as to prevent the pinion gear 26 from being disengaged from the rack 39 when the first fixture plate 22 and the second fixture plate 24 relatively rotate. The pitch radius of the pinion gear 26 is set so as to be substantially equal to a bend radius R of the bend section of the tube 20 formed by the roll 21.

The bolt 28 passes through the connecting member 27, the pinion gear 26 and the boss portion 25 so that its front end portion is protruded from the boss portion 25. As shown in FIG. 1, the front end portion of the bolt 28 engages with a toothed hole 29 formed in the hub portion of the roll 21. The bolt 28 also serves the mechanical function in connecting the roll 21 and the pinion gear 26 coaxially to the second fixture plate 24, so that the second fixture plate 24 rotates by the same angle with the roll 21 and the pinion gear 26. Furthermore, the bolt 28 is fitted into the connecting member 27 loosely so that the connecting member 27 and the second fixture plate 24 are connected to each other so as to be relatively rotatable.

Referring to FIGS. 2 and 3, the operation of the bending machine with the above described construction will be described below.

As shown in FIG. 3, after the first fixture plate 22 and the second fixture plate 24 are stretched out by an angle of 180 degrees to be straight, the tube 20 to be bent is held between the tube pressure dies 23a, 23b and 23c.

Then, when the second fixture plate 24 is slowly rotated while the first fixture plate is fixed, the roll 21 and the pinion gear 26 are rotated by an angle equal to the angle of rotation of the second fixture plate 24. With the rotation of the second fixture plate 24, the tube 20 is being bent so as to be wound onto the outer periphery of the roll 21. While the tube 20 is being bent, the pinion gear 26 rolls while engaging with the rack 30 as the connecting member 27 slides on the back face of the rack 30. Therefore, the roll 21 incorporated with the pinion gear 26 moves along the rack 30 as if it winds up the tube 20, so that the bend section is formed in the tube 20.

Figure 4:
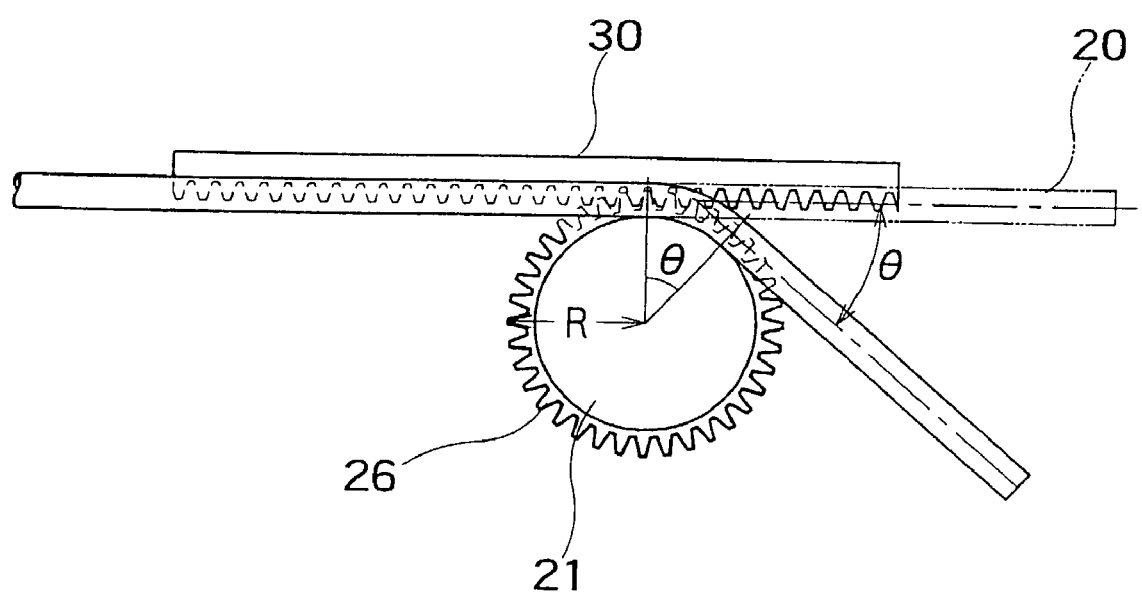
FIG. 4 is a schematic diagram showing the principle of the bending machine in the preferred embodiment.

FIG. 4 schematically shows the functions of the rack 30 and pinion gear 26. Assuming that a bend radius is R, the angle of rotation of the pinion gear 26 while the second fixture plate 24 rotates by angle $\Theta$ is equal to the angle of rotation of $\Theta$. Since the pitch radius of the pinion gear 26 is R which is equal to the bend radius, the pinion gear 26 moves along the rack 30 by R. The length of the circular arc portion of the tube 20 wound onto the roll 21 is also R $\Theta$. Therefore, while the tube 20 is bent around the outer periphery of the roll 21, the position of the end portion of the tube 20 does not shift in each of the first and second fixture plates 22 and 24 before and after the bending operation, unlike conventional bending machines.

Thus, since the bent section of the tube 20 is being formed as expected without being elongated and without applying any excessive force thereon, it is possible to reduce deformation, such as collapse, of the tube 20, and it is possible to precisely carry out bending operation even if the bend radius is small.

To the contrary, if the first fixture plate 22 is rotated while the second fixture plate 24 is fixed, the operation is the same.

While the bend radius of the tube 20 has matched with the pitch radius of the pinion gear 26 in the above described preferred embodiment, tolerances due to deformation can be corrected in bending of a tube, which is unavoidably easily deformed from the nature of the material of the tube, by changing the pitch radius of the pinion gear with respect to the bend radius in accordance with the material of the tube 20. That is, in the case of an extendable or drawable polymer tube, it is possible to more precisely carry out bending while reducing collapse if the pitch radius of the pinion gear 26 is set to be slightly smaller than the bend radius.

[Second Preferred Embodiment]

Figure 5:
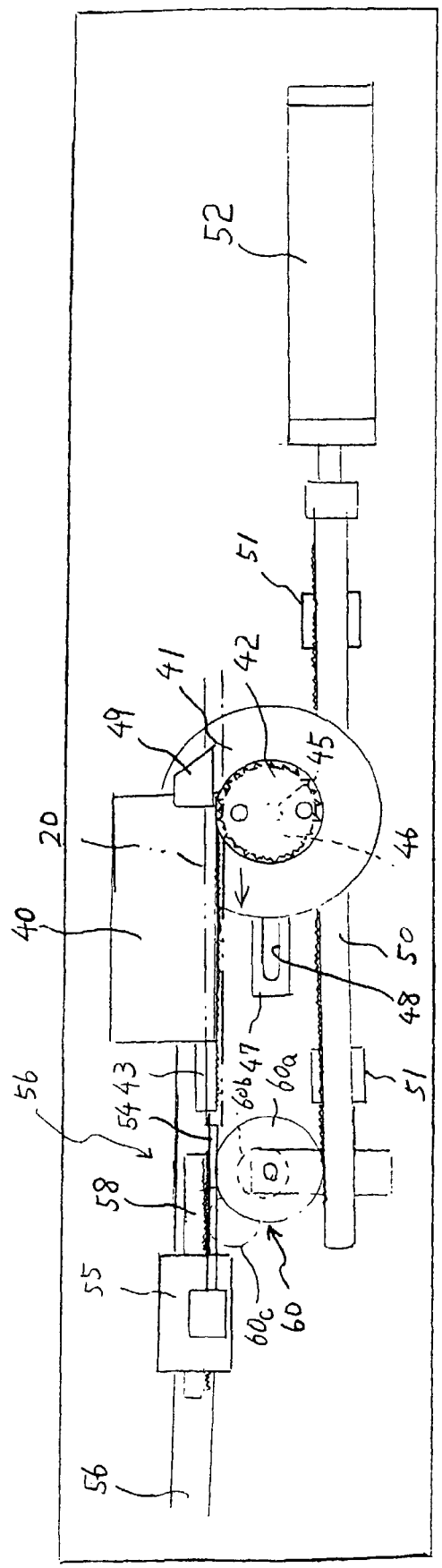
FIG. 5 is a partially omitted plan view of the second preferred embodiment of a bending machine according to the present invention.

Referring to FIG. 5, the second preferred embodiment of a bending machine according to the present invention will be described below.

FIG. 5 is a plan view of the second preferred embodiment of a bending machine according to the present invention. In FIG. 5, reference number 40 denotes a first fixture plate, and reference number 41 denotes a second fixture plate. In this second preferred embodiment, the second fixture plate 41 has a form of a disk-shaped plate. Reference number 42 denotes a roll serving as a bending die coaxially fixed to the second fixture plate 41.

In the side face of the first fixture plate 40, a groove for holding the tube 20 against the radial reaction force applied thereon is formed so as to extend in longitudinal directions. On the side face of the first fixture plate 40, a first rack 43 is mounted. A pinion gear 46 is joined fixedly to the second fixture plate 41 via a shaft 45 coaxially fixed to a side face of the second fixture plate 41, on the other side face of which the roll 42 is mounted. In this case, the shaft 45 of the pinion gear 46 is designed to engage slidably with a long hole 48 which is formed in a connecting member 47 so as to extend in longitudinal directions of the first rack 43. Furthermore, a pressure die member 49 for holding the tube 20 is mounted on the top face of the second fixture plate 41.

In this second preferred embodiment, a second rack 50 for rotating and driving the roll 42 is provided so as to be capable of reciprocating in parallel to the first rack 43 via a linear guide block 51. Teeth of the second rack 50 have the same pitch as that of the first rack 43, and are designed to mesh with the pinion gear 46. The base end portion of the second rack 50 is connected to an air cylinder 52 serving as a linear driving mechanism for reciprocating the second rack 50.

In FIG. 5, reference number 54 denotes a mandrel 54 for preventing collapse of the tube 20 when the tube 20 is being bent, and reference number 56 denotes a mandrel synchronous moving mechanism for retracting the mandrel 54 substantially in unison with the movement of the roll 42.

The mandrel 54 is mounted on a movable base 55 which is movable along the guide rail 56 in parallel to the first rack 43. On the movable base 55, a third rack 58 is fixed in parallel to the second rack 50. In this case, the second rack 50 and the third rack 58 have teethes having the same pitch. The velocity of linear movement of the second rack 50 is reduced to ½ to be transmitted to the third rack 58 by means of a gear train 60 comprising a pinion gear 60a, an idler gear 60b and a small pinion gear 60c.

According to the second preferred embodiment with the above described construction, the displacement of the second rack 50 driven by the air cylinder 52 to bend the tube 20 must be twice as large as the displacement of the pinion gear 46 linearly moving in a direction of arrow while engaging with the first rack 43. In other words, the distance of movement by the same workpiece is twice, so that the driving force of the air cylinder 52 necessary for driving the roll 42 is only ½. Therefore, it is possible to reduce load applied to the air cylinder 52. That is, it is possible to double driving force even if the air cylinder 52 is a driving mechanism having a small capacity.

Such linear movement of the second rack 50 is reduced to be half by the gear train 60 to be transmitted to the moving base 55 via the third rack 58. As a result, the mandrel 54 moves with the moving base 55 by the same distance as the displacement and at the same velocity as that of the roll 42 linearly moving while bending the tube 20, the front end portion of the mandrel 54 is always coincident with the initially bending position of the tube 20. Therefore, it is possible to suitably prevent crushing of the tube 20 by the mandrel 54, so that it is possible to carry out bending without deformation.

[Third Preferred Embodiment]

Figure 6:
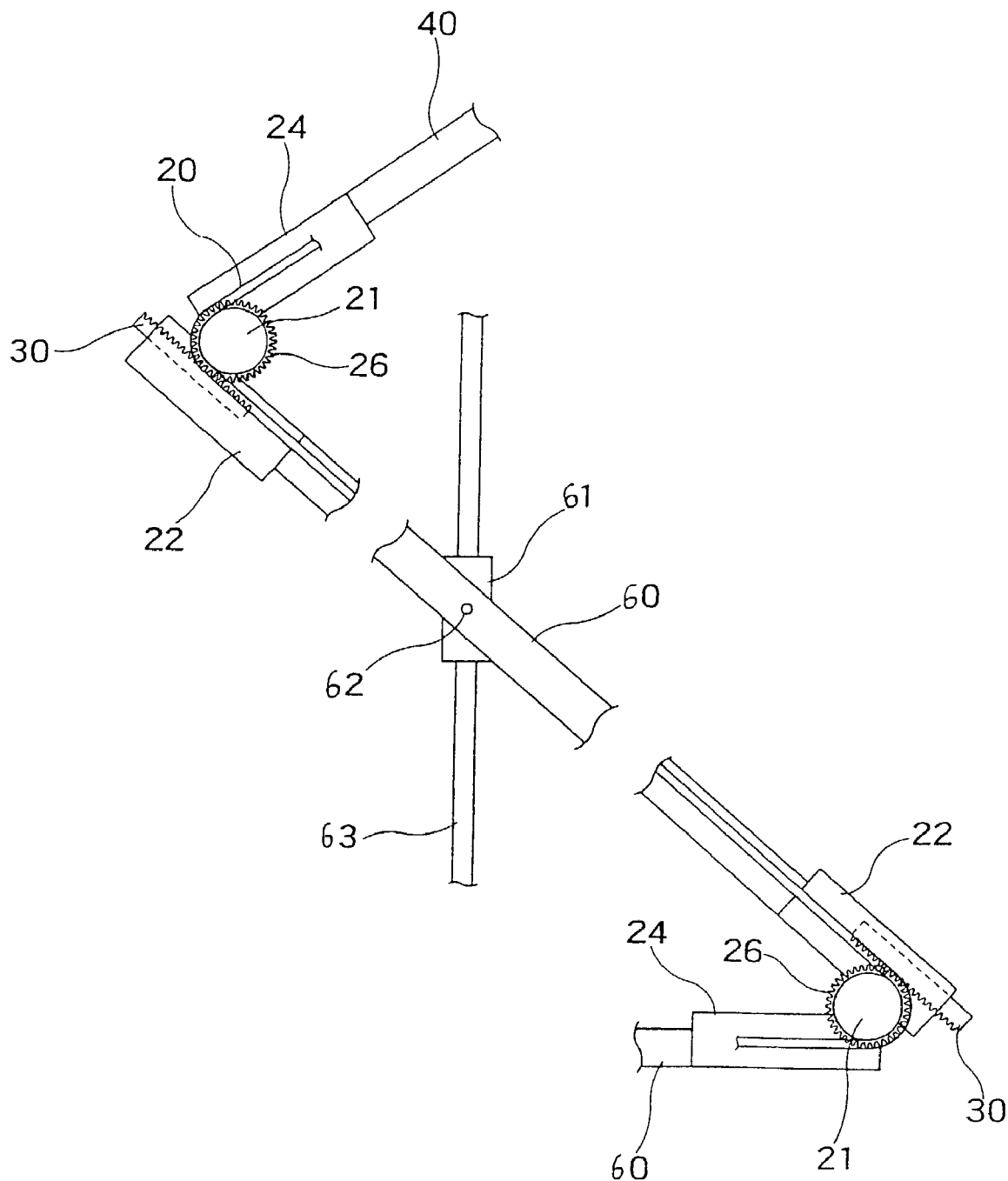
FIG. 6 is a partially omitted plan view of the third preferred embodiment of a bending machine according to the present invention.

Referring to FIG. 6, the third preferred embodiment of a bending machine according to the present invention will be described below.

In this third preferred embodiment, a multi-stage bending process can be carried out simultaneously with respect to a single tube 20.

As shown in FIG. 6, a plurality of bending units, each of which is a bending apparatus shown in FIG. 1 as one unit are arranged in a manner that connected to each other in series. In FIG. 6, the same reference numbers as those in FIG. 1 denotes the same components as those in FIG. 1. In this preferred embodiment, the respective rolls 21 have the same radius, and the pitch radius of the pinion gear is the same as the radius of the bend by the roll 21.

In the simultaneous bending machine, in adjoining units, the first fixture plates 22 or the second fixture plates 24 are joined to each other by means of a connecting link 60 having a predetermined length. A slider 61 is linked to each connecting link 40 via a pin 62 at the center thereof. The slider 61 is enable to move slidable on a guide rail 63.

Thus, according to the simultaneous bending machine, the tube 20 can be bent into a zigzag form at the same time by folding down the connecting plate 40 of the simultaneous bending machine as shown in FIG. 6 after clamping fixedly both end portions of the tube as described in the first preferred embodiment.

The reason why such multi-stage simultaneous bending process can be achieved as follows.

Figure 7:
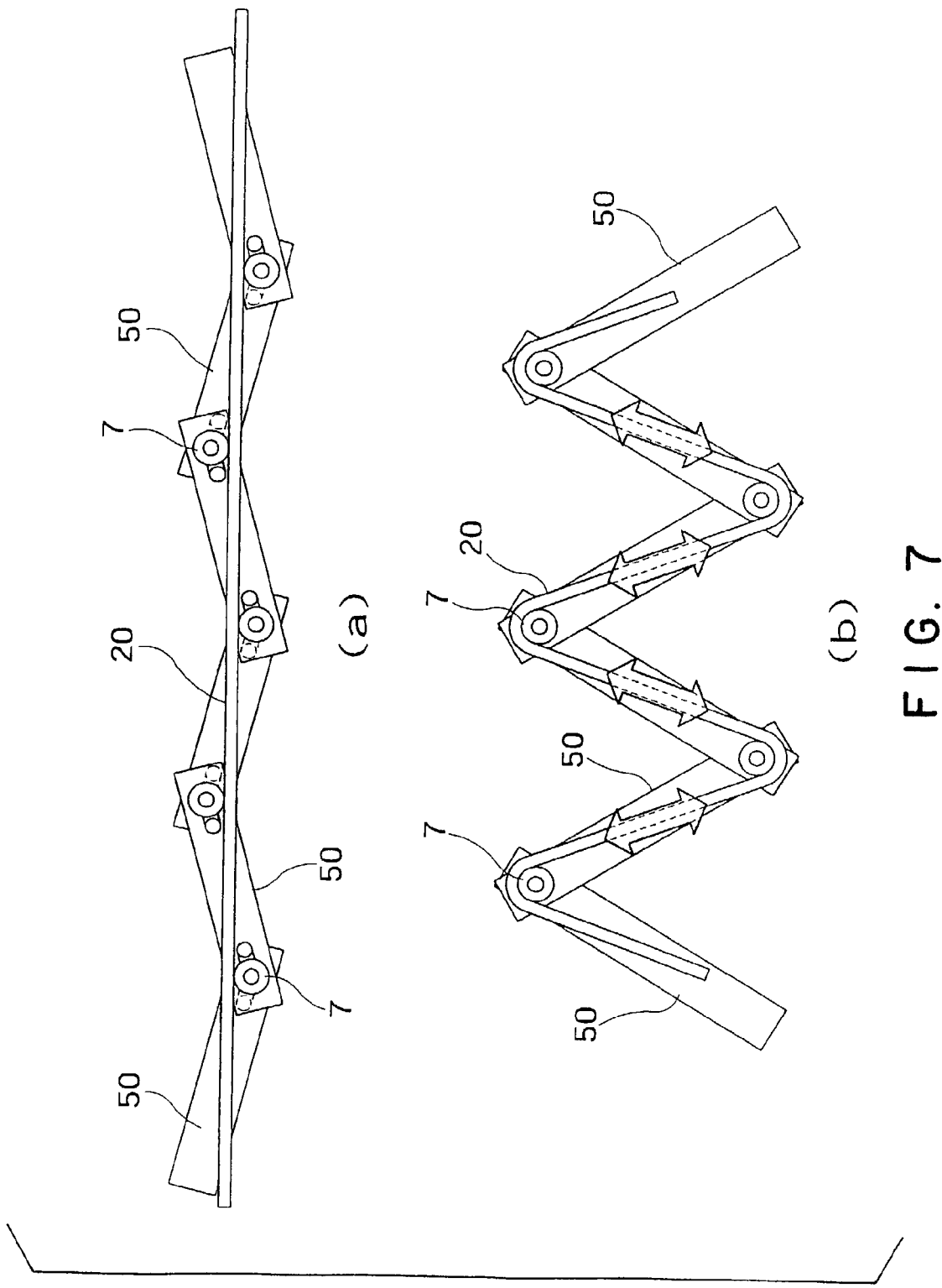
FIG. 7 is an illustration for explaining a simultaneous multistage bending by a conventional bending machine.

FIG. 7(a) shows a condition in which conventional bending units with fixed rolls 7 are connected to each other in series to bend a tube 20.

In a case where the rolls 7 are fixed, when the tube 20 is intended to be bent in the form of the zigzag at the same time, the length of the bent circular arc portion of the tube 20 wound onto each roll 7 is different from the length of the joint portion of the link 50 corresponding to the circular arc portion, so that there is a relationship between the tube 20 and the folded link 70 as if both end portions of the tube is shortened. Therefore, as shown in FIG. 7(b), if the tube is intended to be bent at the same time, the tube 20 is strain to prevent the link 70 from being folded, so that it is substantially impossible to bend the tube.

On the other hand, according to this preferred embodiment, as described in the first preferred embodiment, the position of the roll 21 moves by the length of the circular arc wound onto the roll 21, so that the relationship between the tube 20, the fixture plates 22, 24 and the connecting link 60 is constant as a whole during the bending operation. Therefore, it is possible to proceed successfully a bending operation in the form of the zigzag at the time while preventing the tube 20 from being stretched in the middle thereof.

While the tube has been described as an example of a workpiece to be bent, the present invention can be applied to a workpiece, such as a hollow thin rod, or a workpiece having a rectangular cross-section.

[Fourth Preferred Embodiment]

FIGS. 8 through 11 show the fourth preferred embodiment of a bending machine according to the present invention.

The bending machine in this fourth preferred embodiment is a bending machine for further applying a secondary multi-stage-bending process on the tube 20 which has been already bent in the form of the zigzag by the above described bending machine in the third preferred embodiment. The secondary multi-stage-bending process aims to bend the tube 20 in a direction perpendicular to the bending direction of the primary multi-stage-bending process in the third embodiment. In this preferred embodiment, the tube 20 is formed to produce a part of a wire condenser in a condenser unit or the like. In this fourth preferred embodiment, a pair of bending units 77 and 78, each of which consist of primary bending unit 80 as the same as the bending unit in the third preferred embodiment, are basically arranged on the right and left sides of the tube 20. Therefore, in FIG. 8, the primary bending units 80 for which comprises a first fixture plate 22, a second fixture plate 24, a pinion gear 26 and a rack 30 is basically the same as that in the third preferred embodiment. A plurality of the primary bending units 80 includes a plurality of link members 82*a* through 82*h* which are connected in series by the shafts 83 of the pinion gears 26 so as to be bent by the shafts 83.

In this preferred embodiment, the link members 82*a* through 82*h* have the lengths increasing sequentially. The link member 82*a* on the side of one end is rotatably supported on a pivot 84*a*, and is supported on a slider 86*a* in a manner like a cantilever. The link member 83*a* holds the second fixture plate 24*a*, on one end portion of which the rack 30 is secured. On the link member 82*b* following the link member 82*a*, the first fixture plate 22*a* is mounted via a pivot 84*b*. In this case, the first fixture plate 22*a* is designed to rotate together with the pivot 84*b*. The first fixture plate 22*a* is connected to the second fixture plate 24*b* which is held by the adjacent link member 82*c* via the shaft 83. Subsequently, the unit bending units 80 are similarly connected by the link members 82*c* through 82*h*. The above described linkage of the primary bending units 80 is the same in the first and second bending units 77 and 78. However, in the first bending unit 77, long rod-like rolls 88*a* through 88*g* used as bending dies are connected coaxially with the shafts 83, respectively. In the second bending unit 78, the front end portion of each of the rolls 88*a* through 88*g* is detachably connected to the tip portion of a facing one of the shafts 83. Thus, the rolls 88*a* through 88*g* are shared.

Figure 9:
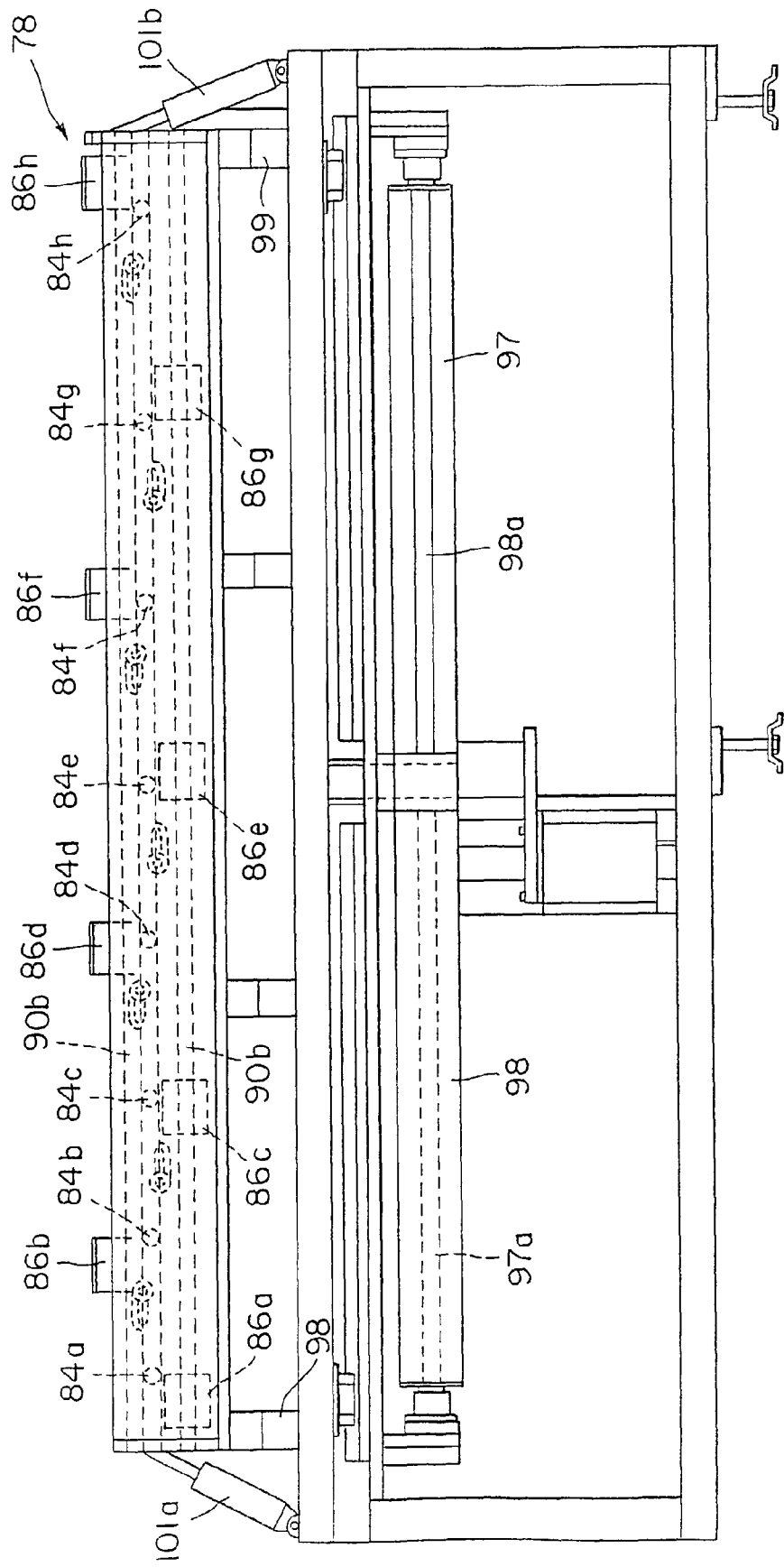
FIG. 9 is a plan view of the bending machine of FIG. 8.

As shown in FIG. 9, the sliders 86*a* through 86*h* which is supported by the pivots 84*a* through 84*h* in a manner like cantilevers, respectively, are designed to slidably engage with two guide rails 90*a* and 90*b* which are provided on the side face of the machine casing in parallel. In this case, the alternate sliders 86*a*, 86*c*, 88*e* and 86*g* engage with the lower guide rail 90*a*, and the remaining sliders 86*b*, 86*d*, 86*f* and 86*h* slidably engage the upper guide rail 90*b*. By thus alternately arranging the sliders on the guide rails 90*a* and 90*b*, it is possible to avoid the interference of the sliders with each other when the bending units 77 and 78 are folded.

Figure 10:
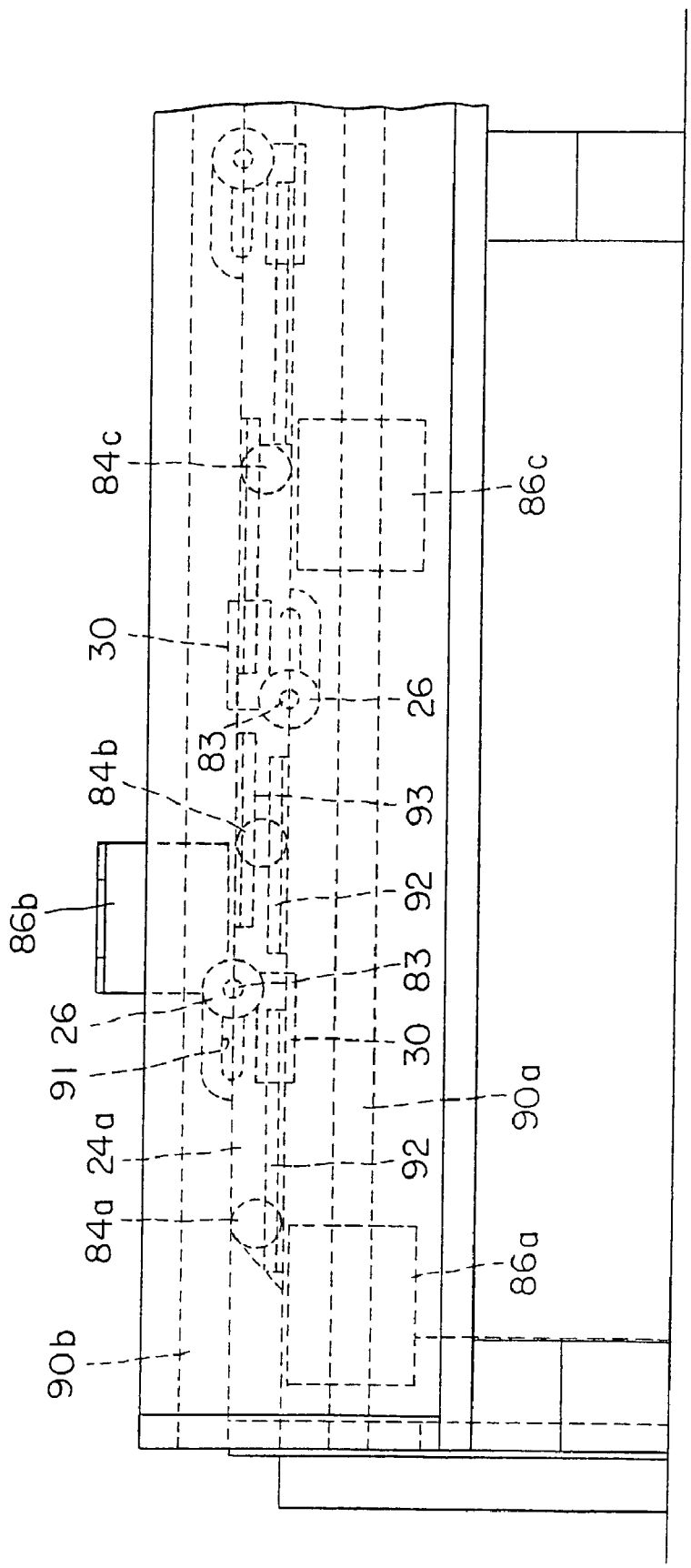
FIG. 10 is a side view showing a slider.
Figure 11:
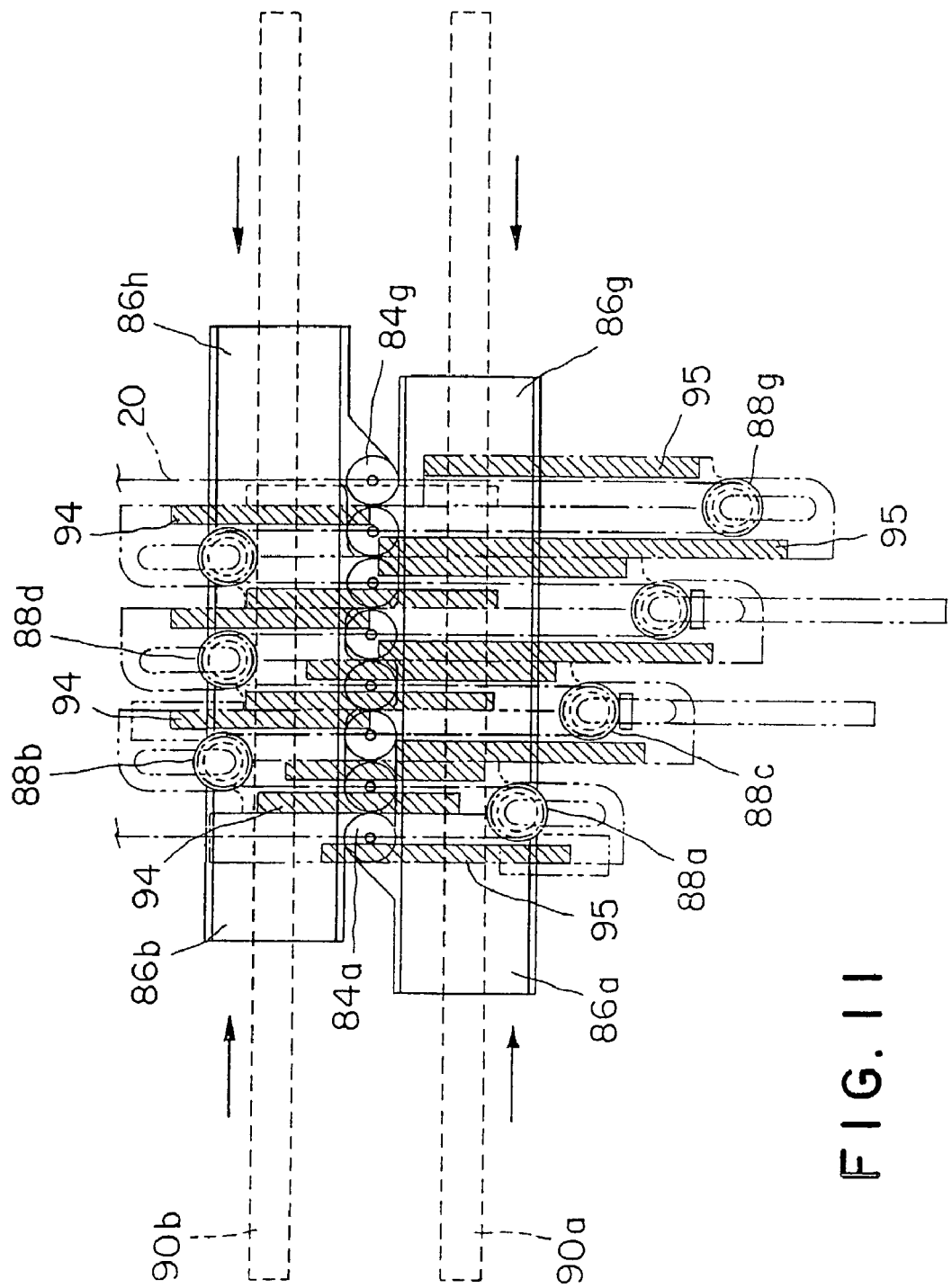
FIG. 11 is a schematic side view showing a bending machine in a state that a workpiece is multistage-bent.
Figure 12:
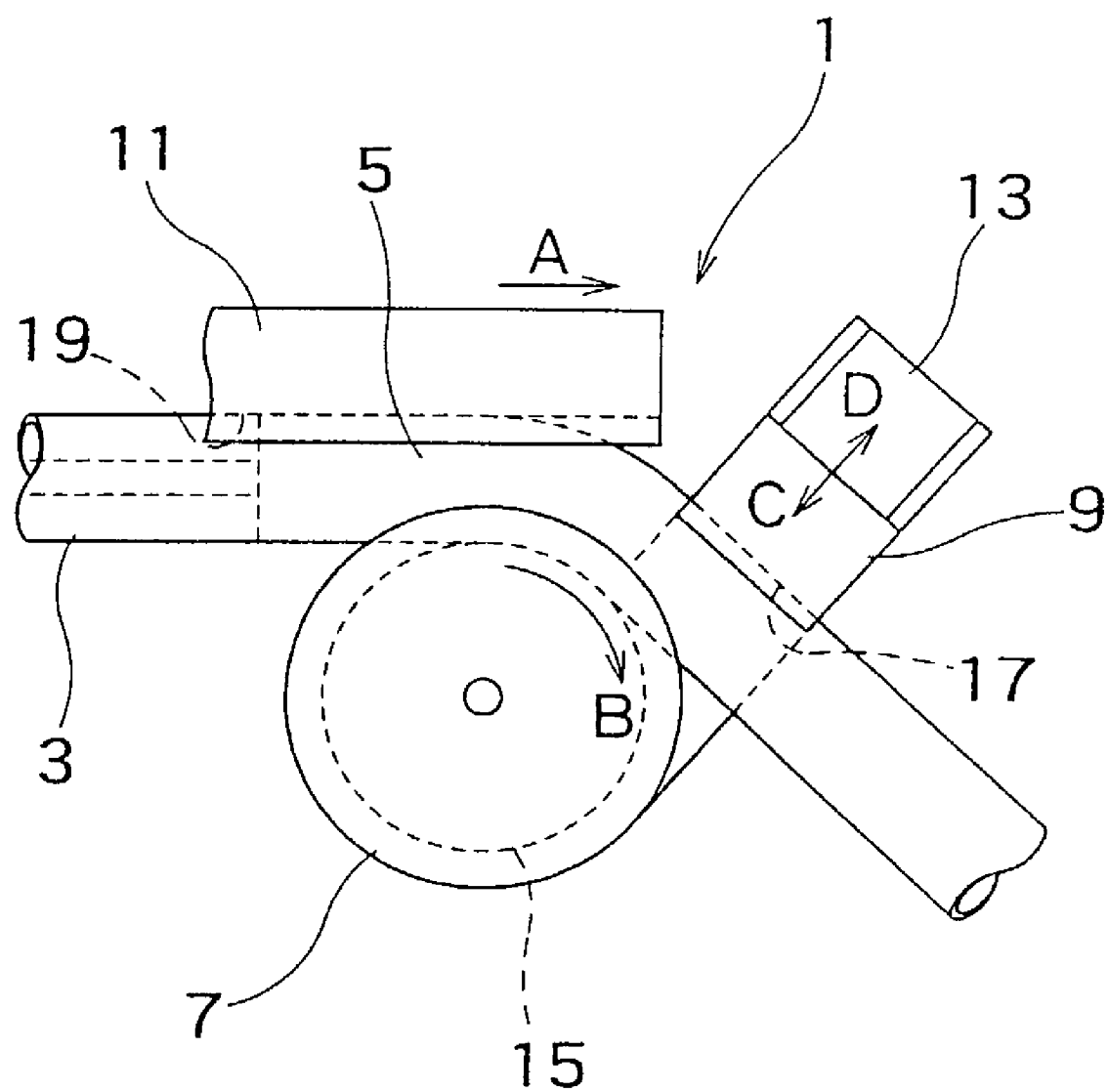
FIG. 12 is a side view of a conventional bending machine.

As shown in FIG. 10, a long hole 91 is formed in the connecting portion of the second fixture plate 24*a* to the first fixture plate 22*a*, and engages with the shaft 83 loosely. Thus, similar to the above described first preferred embodiment, it is possible to engage with the rack 30 while moving the tube 20 by the same amount as that of the tube wound onto the roll. Reference numbers 92 and 93 denote positioning members for clamping and positioning the tube 20 so as to prevent the tube 20 from being shifted from the link members 82*a* through 82*h*.

Figure 8:
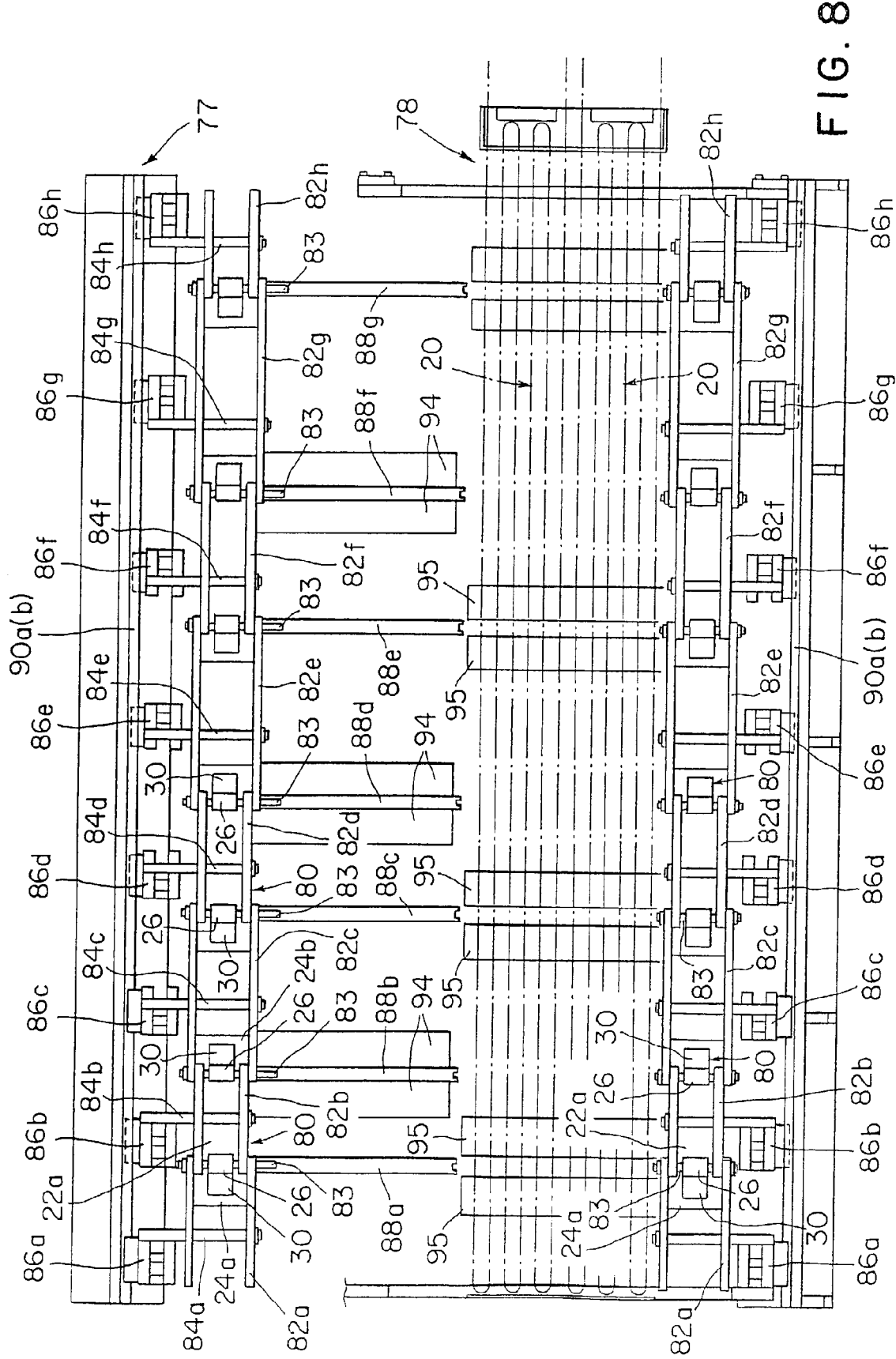
FIG. 8 is a plan view of the fourth preferred embodiment of a bending machine according to the present invention.

In FIG. 8, reference number 94 denotes tube pressure die members which are mounted on the side faces of the link members 82*a* through 82*h* of the first bending unit 77 in parallel. In this case, these tube pressure die members 94 are designed to press the crest portions curving upwards of the bent tube 20 downwardly at intervals. On the other hand, reference number 95 denotes tube presser members which are mounted on the side faces of the link members 82*a* through 82*h* of the second bending unit 78 in parallel. In this case, these tube presser members 95 are designed to press the valley portions curving inwards of the bent tube 20 upwardly at intervals.

As shown in FIG. 9, reference numbers 97 and 98 denote cylinders constituting linear driving mechanisms for applying, to the pair of bending units 77 and 78, the linear reciprocating motion for folding the link members 82*a* through 82*h* and the primary bending units 80 in the form of a zigzag and for unfolding or stretching them out.

In this case, the top end of the piston rod 97*a* of the cylinder 97 is connected to the end slider 86*a* via a column 98. This column 98 is slidable along a guide rail arranged horizontally. Similarly, the piston rod 98*a* of the cylinder 98 opposite to the cylinder 97 is connected to the slider 86*h* on the side of the other end via a column 98. These cylinders has the about half of the whole length of the unit bending unit.

In the above described fourth preferred embodiment, in FIG. 8, the first bending unit 77 is advanced with respect to the second bending unit 78 to cause the respective rolls to butt against the shafts 83 of the second bending unit 78. Then, as shown in FIG. 8, two tubes 20 bent by the bending machine in the third preferred embodiment are set. In this case, the rolls have a width capable of simultaneously working the two sets of tubes 20.

Then, when the respective cylinders 97 and 98 are operated and when the sliders 86*a* through 86*h* are moved from both ends so as to decrease their intervals, the respective tubes 20 are bent in the form of zigzag as a whole while being pressed by the tube pressure die members 94 and 95. In this initial stage, if force is obliquely applied to the sliders 86*a* and 86*b* by initial biasing cylinders 101*a* and 101*b*, respectively, which are provided on both end portions, the subsequent bending operation can be smoothly carried out. In this case, since each of the primary bending units has the same operation as that in the first through third preferred embodiments, the tubes 20 are not stretched to prevent the link 70 from being folded down, so that two sets of tubes 20 can be bent at a stroke.

After bending ends, cylinders (not shown) are operated to open the first and second bending units, and then, the first bending unit 77 may be retracted. At this time, the tube presser 94 pressing the tubes 20 from the top is also retracted with the first bending unit 77 to open the top of the folded tubes 20, so that the tubes 20 can be raised to be taken out as they are.

As can be clearly seen from the above description, according to the present invention, it is possible to smoothly bend a workpiece in a process for bending the workpiece along the outer peripheral portion of the rolls, and particularly, it is possible to precisely bend a tube without deformation, such as crashing.

In addition, it is possible to carry out multi-stage bending operations with respect to a single workpiece at a time, so that it is possible to greatly improve the bending efficiency.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A bending machine for bending a workpiece having an elongated form, comprising:
   a first fixture member for holding one end portion of the workpiece thereon;
   a second fixture member for holding the other end portion of the workpiece thereon;
   a first rack mounted on the first fixture member so as to extend in a longitudinal direction of the first fixture member;
   a bending die having a form of a roll, secured on the second fixture member, means for bending the workpiece around an outer peripheral surface of the bending die;
   a pinion gear, attached fixedly and coaxially with the bending die, adapted for meshing with the first rack; and
   a connecting means for connecting the first fixture member to the second fixture member to allow the first and second fixture members to rotate relatively so that the pinion gear is movable along the first rack while engaging therewith,
   wherein said bending die is movable together with the pinion gear to bend the workpiece, when one of said fixture members rotates relative to the other fixture member,
   wherein said connecting means comprises:
   a second rack meshing with the pinion gear, said first and second racks being provided with equal pitch, said second rack being arranged parallel to the first rack; and
   a linear driving mechanism for linearly reciprocating the second rack to cause the bending die to rotate with the pinion gear while engaging with the first rack.

2. A bending machine according to claim 1, wherein said pinion gear has a pitch radius related to a radius of the bending die such that upon rotation of the bending die the workpiece is bent along a bend radius corresponding to said pitch radius of the pinion gear.

3. A bending machine according to claim 1, wherein said bending die and said fixture members are relatively positioned to hold the workpiece at a distance from a center of the bending die such that the workpiece will be bent with a bend radius, not equal to a pitch radius of the pinion gear.

4. A bending machine according to claim 1, wherein the workpiece is a metal tube, said bending machine further comprising a mandrel insertable into the workpiece for preventing the workpiece from collapsing.

5. A bending machine according to claim 4, which further comprises a mandrel synchronous moving mechanism for retracting the mandrel in unison with the movement of the bending die, said mandrel synchronous moving mechanism comprising:
   a third rack which has a pitch equal to that of the second rack and which is movable in longitudinal directions;
   a moving base on which the mandrel is mounted; and
   a gear train for transmitting a linear movement of the second rack to the third rack while reducing a velocity of the second rack to one-half that of the third rack.

6. A bending machine for bending a workpiece having an elongated form, said bending machine including a bending system comprising; a plurality of primary bending units, each comprising first and second fixture members for holding opposite end portions of the workpiece to be bent thereon, a rack mounted on the first fixture member, a bending die having a form of a roll which is secured on the second fixture member, means for bending the workpiece with a circular form around an outer peripheral surface of the bending die, a pinion gear attached fixedly and coaxially with the bending die, for meshing with the first rack, and a connecting means for connecting the first fixture member to the second fixture member in an arrangement that allows each of the fixture members to rotate relatively so that the pinion gear is movable along the first rack while engaging with the rack;
   a plurality of link members which are connected to each other via the primary bending units in a zigzag arrangement;
   a plurality of sliders for rotatably supporting the link members, respectively; and
   a guide rail for slidably guiding the sliders.

7. A bending machine according to claim 6, which further comprises:
   a pair of the bending systems, each being arranged on opposite sides of the workpiece so that either of the bending systems is capable of approaching and withdrawing from the workpiece; and
   a linear driving mechanism for applying a linear reciprocating motion to the pair of bending systems to fold and unfold the link members and the primary bending units.

8. A bending machine according to claim 7, wherein said bending die of each of the bending systems has a rod-like shape which is common to a pair of adjoining primary bending units and which is capable of simultaneously bending at least two workpieces arranged in parallel.

9. A bending machine according to claim 8, wherein one bending systems has a pressure plate provided with each of said first and second fixture members, for downwardly pressing the workpiece to form a crest portion of the workpiece and another bending system has a pressure plate provided with each of the first and second fixture members, for upwardly pressing the workpiece to form a valley portion of the workpiece.

* * * * *